(12) United States Patent
Jaeger

(10) Patent No.: US 6,422,695 B1
(45) Date of Patent: Jul. 23, 2002

(54) METHODS OF PRINTING PHASE CHANGE INK COMPOSITIONS

(75) Inventor: C. Wayne Jaeger, Beaverton, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/038,037

(22) Filed: Jan. 2, 2002

Related U.S. Application Data

(62) Division of application No. 09/645,166, filed on Aug. 23, 2000.

(51) Int. Cl.$^7$ .................................................. B41J 2/175
(52) U.S. Cl. ........................... 347/88; 347/99; 347/100; 106/31.44; 106/31.28; 106/31.29
(58) Field of Search ........................... 347/88, 99, 100; 106/31.44, 31.29, 31.28

(56) References Cited

U.S. PATENT DOCUMENTS

| | | |
|---|---|---|
| 4,889,560 A | 12/1989 | Jaeger et al. |
| 5,372,852 A | 12/1994 | Titterington et al. |
| 5,827,918 A | 10/1998 | Titterington et al. |

FOREIGN PATENT DOCUMENTS

| | | |
|---|---|---|
| GB | 2021138 A | 5/1979 |

*Primary Examiner*—Samuel Barts
(74) *Attorney, Agent, or Firm*—Wells St. John P.S.

(57) ABSTRACT

The invention encompasses a compound having the formula:

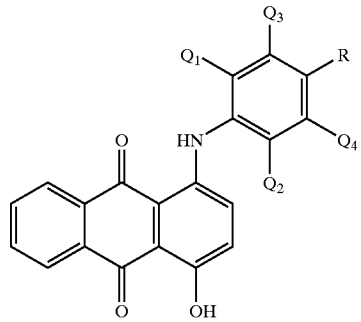

wherein at least one $Q_1$, $Q_2$, $Q_3$ and $Q_4$ is a halogen atom and any of $Q_1$, $Q_2$, $Q_3$ and $Q_4$ which is not a halogen atom is a hydrogen atom; and wherein R comprises at least two carbon atoms. The invention further encompasses inclusion of such compound into phase change ink carrier compositions, as well as printing methods utilizing such compound.

20 Claims, 1 Drawing Sheet

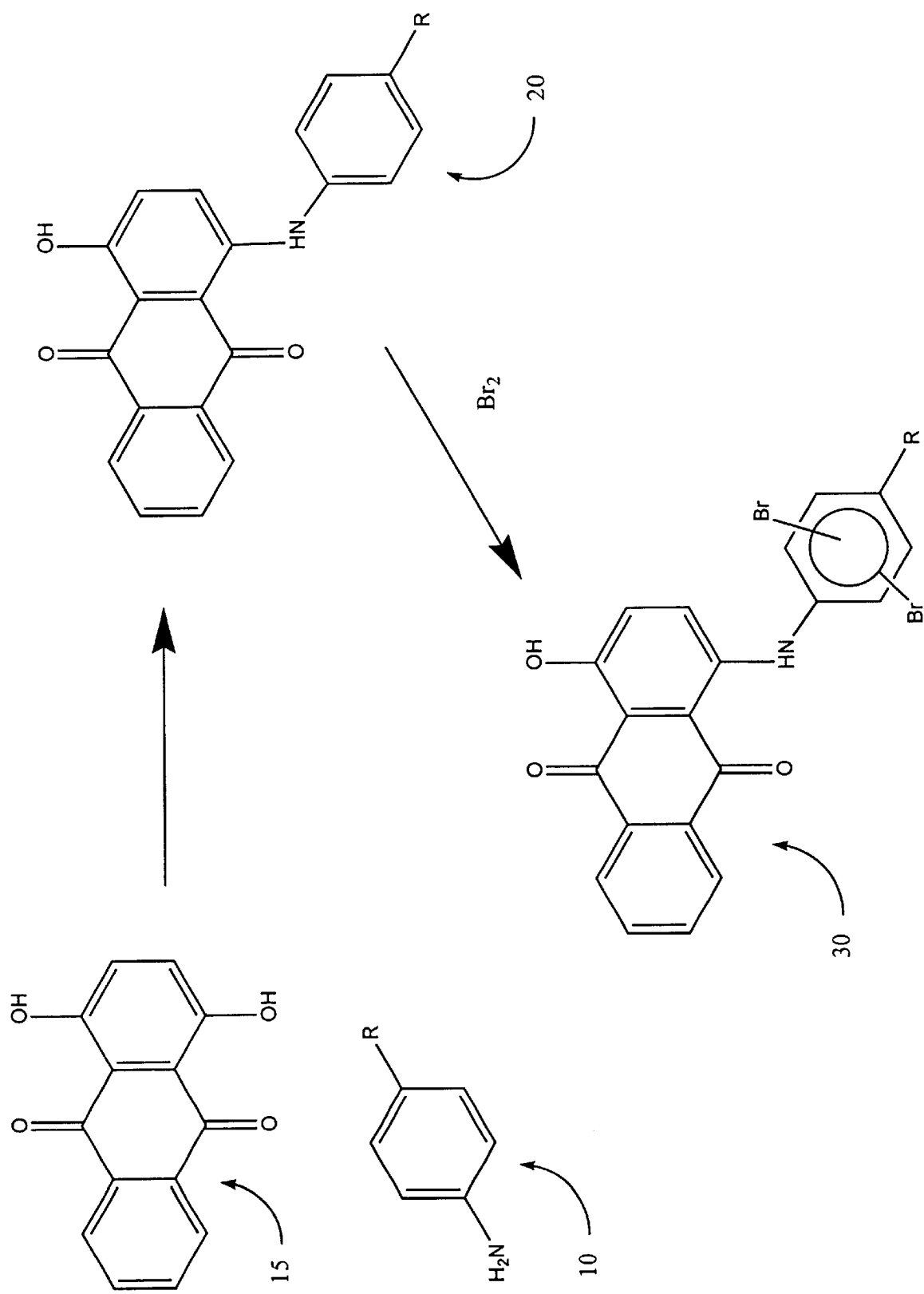

METHODS OF PRINTING PHASE CHANGE INK COMPOSITIONS

RELATED PATENT DATA

This patent resulted from a divisional application of U.S. patent application Ser. No. 09/645,166 filed on Aug. 23, 2000.

BACKGROUND

1. Field of the Invention

The invention relates to new compositions of matter which can be utilized as colorant compounds. In particular applications, the invention pertains to phase change ink formulations. In other particular applications, the invention pertains to methods of printing.

2. Description of Relevant Art

The present invention encompasses new colorant compounds and methodology for incorporating such compounds into phase change inks. Phase change inks are compositions which are in a solid phase at ambient temperature, but which exist in a liquid phase at an elevated operating temperature of an ink jet printing device. At the jet operating temperature, droplets of liquid ink are ejected from the printing device. When the ink droplets contact the surface of a printing media, they solidify to form a printed pattern. Phase change ink methodology is described generally in U.S. Pat. Nos. 4,889,560; 5,372,852 and 5,827,918.

Phase change inks generally comprise a waxy organic compound (typically a tetra-amide material), a tackifier, and a viscosity modifying agent as primary components. An exemplary viscosity modifying agent is stearylstearamide, which can be provided to a concentration of less than or equal to about 60% (by weight). An exemplary tackifier is KE-100 Resin, an ester of tetrahydroabietic acid and glycerol, which is available from Arakawa Chemical Industries Ltd. Tackifiers are typically provided to a concentration of less than or equal to about 30% (by weight). Exemplary tetra-amide compounds can be formed by reacting ethylene diamine with a dimer acid and an appropriate fatty acid.

In addition to the above-described primary components, phase change inks can comprise a number of secondary components, such as, for example, colorants (for example, dyes), plasticizers, and antioxidants, as described in, for example, U.S. Pat. Nos. 4,889,560 and 5,372,852.

A definition which will be adopted in this disclosure and the claims that follow will be to refer to a phase change ink composition as comprising a colorant and a carrier. The term "carrier" is to be understood to comprise everything in the phase change ink composition besides the colorant. In phase change ink compositions comprising more than one colorant, the carrier will include everything except a particular colorant of interest, and can, therefore, comprise colorants other than that which is of interest.

A difficulty associated with phase change inks can be in solubilizing colorants. The colorants generally comprise polar functional groups, and accordingly are insoluble in an organic carrier of a phase change ink composition. Accordingly, it is desirable to develop new colorants having improved solubility in phase change ink carrier compositions.

An exemplary prior art colorant compound is C.I. Solvent Red 172, which is shown below as formula 1.

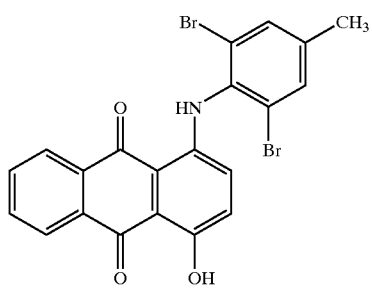

Formula 1.

Such colorant manifests a magenta color that could be useful in phase change inks. However, C.I. Solvent Red 172 has less than satisfactory solubility in present phase change ink carrier compositions. Accordingly, it would be desirable to form a composition having chromophoric properties similar to C.I. Solvent Red 172, but with improved solubility in phase change ink carrier compositions.

SUMMARY

In one aspect, the invention encompasses compounds having the formula 2:

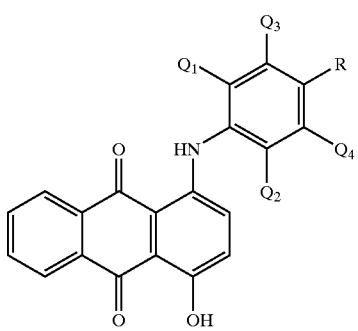

Formula 2.

wherein at least one $Q_1$, $Q_2$, $Q_3$ and $Q_4$ is a halogen atom and any of $Q_1$, $Q_2$, $Q_3$ and $Q_4$ which is not a halogen atom is a hydrogen atom; and wherein R comprises at least two carbon atoms. The invention further encompasses inclusion of such compounds into phase change ink carrier compositions, as well as printing methods utilizing such compounds.

In another aspect, the invention encompasses compounds having the formula 3:

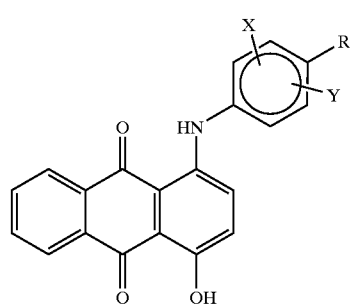

Formula 3.

wherein X and Y are halogen atoms and can be the same or different than one another, and wherein R comprises at least two carbon atoms. The invention further comprises inclusion of such compounds in phase change ink compositions, and printing methods utilizing such compounds.

In yet another aspect, the invention encompasses compounds having the formula 4:

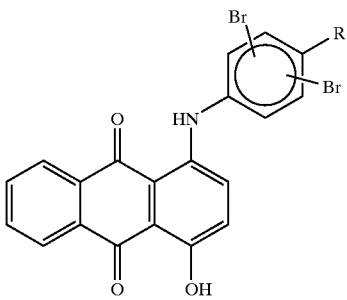

Formula 4.

wherein X is a halogen atom, and wherein R comprises at least two carbon atoms. The invention further encompasses inclusion of such compounds into phase change ink carrier compositions, as well as printing methods utilizing such compounds.

BRIEF DESCRIPTION OF THE DRAWING

The FIGURE shows a generalized reaction scheme for forming a compound encompassed by the present invention.

DETAILED DESCRIPTION

Colorants encompassed by embodiments of the present invention are represented generally as compounds having a formula 2:

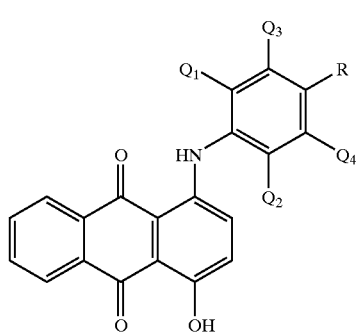

Formula 2.

where at least one of $Q_1$, $Q_2$, $Q_3$ and $Q_4$ is a halogen atom and any of $Q_1$, $Q_2$, $Q_3$ and $Q_4$ which is not a halogen atom, is a hydrogen atom. The R group of compounds having formula 2 comprises at least two carbon atoms.

Advantageously, a colorant encompassed by general formula 2 is more specifically described as compounds having formula 3:

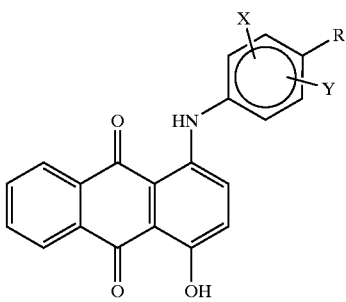

Formula 3.

Such colorant comprises an aromatic hexagonal ring (shown as a hexagonal ring with a circle in the middle) bonded to a nitrogen, which in turn is bonded to a 3-ring structure (specifically, an anthraquinone derivative). Compounds of formula 3 further comprise a carbon-containing group R which is bonded to the aromatic hexagonal ring in a para position relative to the nitrogen atom. Such R groups comprise at least two carbon atoms and in some embodiments comprise from 2 to about 100 carbon atoms. In some advantageous embodiments compounds of formula 3 comprise from 2 to about 50 carbon atoms, and in some embodiments comprise from about 4 to about 20 carbon atoms. Further, the R group of compounds of formula 3 are generally an aliphatic chain, and accordingly can comprise $(CH_2)_n(CH_3)$ wherein n is an integer of from 1 to about 100 and generally is an integer of from 1 to about 50. Advantageously, it is found that wherein n is an integer of from about 4 to about 20, the length of such an aliphatic chain is sufficiently long to render the colorant soluble in a phase change ink carrier while not substantially increasing a melting temperature of a resulting phase change ink composition where the colorant is present in a large concentration.

Referring still to compounds of formula 3, such comprise a pair of halogen atoms X and Y which are bonded to the aromatic hexagonal ring in either ortho or meta positions relative to the nitrogen atom. The symbolism utilized in showing the structure of compounds in accordance with formula 3, depicts bonds from atoms X and Y extending into the circular ring in the center of the aromatic hexagonal ring. Such extension of bonds from X and Y into the circular ring is utilized to indicate that atoms X and Y can be bonded either meta or ortho relative to the nitrogen bond position.

Atoms X and Y can be the same or different than one another, and can be any of the halogen atoms F, Cl, Br or I. In some advantageous embodiments, at least one of X and Y is bromine. In some advantageous embodiments, both of X and Y are bromine and such compounds can be represented, as shown below, by formula 4.

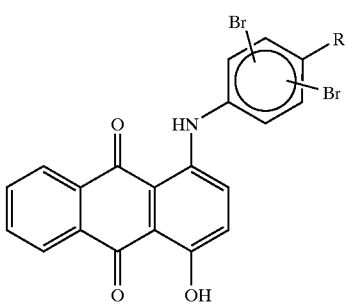

Formula 4.

Further, if both of the bromine atoms are bonded to the aromatic hexagonal ring in ortho positions relative to the nitrogen atom, compounds of formula 4 will have the structure shown below as formula 5.

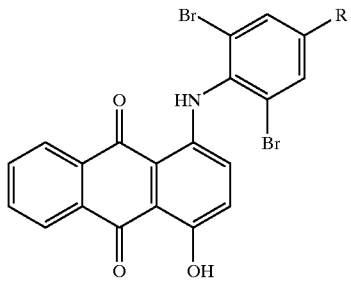

Formula 5.

Compounds in accordance with formula 5 have a magenta color essentially identical to that of C.I. Solvent Red 172. C.I. Solvent Red 172 (compound 1) is not encompassed by formula 5, as the R group of compounds that are encompassed by formula 5 comprise a carbon chain that is longer than the methyl group of compound 1.

While C.I. Solvent Red 172 has previously been utilized in the formulation of phase change inks, its solubility or usable concentration is limited in such formulations. Further, phase change ink formulations containing Solvent Red 172 suffer from a tendency for the magenta dye to crystallize when formed as a solid ink of a printed image. This tendency is exacerbated by fingerprint oils and is seen as a change within the printed image from a bright magenta color to dull purple blotches.

In some particular embodiments of the present invention, it is recognized that it is desirable to create compounds with aliphatic chains that improve the compatibility of the dye with ink base materials as well as reducing the melting point. In addition, such improvements reduce the tendency of the dye to crystallize when formed as a printed image. Also, it will be recognized that substitution of halogen atoms other than bromine for atoms X and Y of compounds in accordance with formulas 3–5 will likely result in compounds having colors other than magenta. Additionally, it is recognized that compounds similar to those of formula 5, but lacking at least one of the atoms X and Y, will also have different colors. Such compounds are shown below as compounds in accordance with formulas 6 and 7.

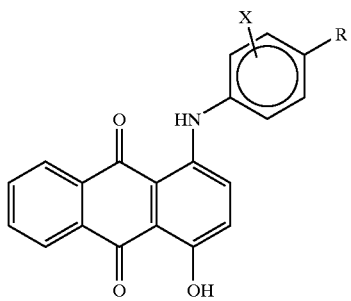

Formula 6.

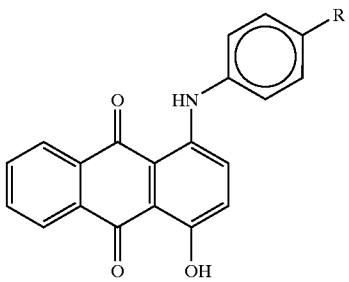

Formula 7.

In such compounds, the group R is the same as the group R discussed for compounds of formula 3. For formula 6, X is a halogen atom which can be positioned in the aromatic hexagonal ring either ortho or meta relative to the nitrogen atom. Compounds in accordance with formula 7 generally have a bluish-violet color.

A method of making a colorant of the present invention is described with reference to the Figure. An aniline derivative 10, with an appropriate R group, is combined with an anthraquinone derivative 15, resulting in the release of water and formation of a compound 20, in accordance with formula 7. Compound 20 is then subjected to bromination to form compound 30, which is in accordance with formula 5. As will be recognized by persons of ordinary skill in the art, the reaction sequence described in the Figure can be modified to make any compound in accordance with formulas 2–7. Each of such compounds having an appropriate R group derived from the aniline derivative 10. For example, useful compounds in accordance with formulas 2–7 have been made where R is butyl, hexyl, dodecyl and tetradecyl.

The reactions utilized in the scheme of the Figure are applications of well understood reaction chemistries. Such reaction chemistries being described in, for example, Chapter 4 of "The Chemistry and Application of Dyes", which is edited by David R. Waring, and Geoffrey Hallas, and published by Plenum Press (1990) of New York, N.Y. Thus while a variety of analogs of C.I. Solvent Red 172 have been prepared, it will be understood that an exemplary preparation of the n-butyl analog of C.I. Solvent Red 172, is sufficient to illustrate the synthetic scheme of the Figure. Such an exemplary preparation is presented in Examples 1 and 2, below.

EXAMPLE 1

Synthesis of C.I. Solvent Violet 13, n-Butyl Analog

To a 500 mL 3-necked round-bottom flask with reflux condenser, stirring and thermometer, 10.5 g of quinizarin[1], 6.5 g of leucoquinizarin[2], about 4 g of boric acid, 10.5 g of 4-butylaniline[3] and about 200 mL of isopropyl alcohol were added. Stirring was initiated and the reaction heated to reflux temperature and maintained at reflux for about 20 hr. While the stirring was continued, the reaction mixture was allowed to cool to room temperature where upon about 200 mL of water was added with continued stirring. After about 30 min, a solid was recovered by filtration. The recovered solid was washed with copious amounts of water and subsequently triturated in 5% NaOH, filtered and the solids washed with water until the filtrate was colorless.

[1]Quinizarin—available from Aceto Corporation of Lake Success, N.Y.
[2]Leucoquinizarin—available from Aldrich Chemicals of Milwaukee, Wis.
[3]4-Butylaniline—available from Aldrich Chemicals of Milwaukee, Wis.

EXAMPLE 2

Synthesis of C.I. Solvent Red 172, n-Butyl Analog Bromination of C.I. Solvent Violet 13, n-Butyl Analog To a 1 L 3-necked round-bottom flask with reflux condenser, stirring, thermometer and constant pressure addition-funnel, about 50 g of the purified product of Example 1, and 500 g of glacial acetic acid[4] were added. Stirring was started and the reaction mixture heated to 50° C. Once the reaction mixture reached 50° C., drop-wise addition of 43.1 g of bromine[5] was started. The addition rate of the bromine was adjusted as needed to maintain the temperature of the reaction mixture at 50° C. The reaction mixture was heated with stirring for an additional 6 hours and then cooled to room temperature. A solid product was collected by filtration and recrystallized from first glacial acetic acid and then 50/50 toluene/acetic acid until pure.

[4]Glacial Acetic Acid—available from Aldrich Chemicals of Milwaukee, Wis.
[5]Bromine—available from Aldrich Chemicals of Milwaukee, Wis.

It will be realized that the synthesis of a colorant, in accordance with embodiments of the present invention, presented in Examples 1 and 2 is for illustrative purposes. Thus any other colorant encompassed by formulas 2–7 as can be made by the illustrative synthetic process or any other known synthetic process is within the scope and spirit of the present invention. For example, where 4-n-dodecyl-aniline is substituted for the 4-n-butyl aniline of Example 1, the n-dodecyl analog of C.I. Solvent Violet 13 is obtained and such is a colorant encompassed by formulas 2–7. Methods for forming other halogenated C.I. Solvent Violet 13 analogs are known. Thus colorants formed by these alternate methods will also be realized to be within the scope and spirit of the present invention.

Once synthesized, the colorant compounds in accordance with the present invention, described above with reference to formulas 2–7, are incorporated into phase change inks. Specifically, such colorant compositions are combined with phase change ink carrier compositions to form such phase change inks. The phase change inks are advantageously formed such that the inks are solid at room temperature, and more specifically are solid at temperatures below about 30° C. Further, such phase change inks are advantageously formulated to melt at a temperature above 30° C. (typically much higher than 30° C.) so that the inks can be jetted through a printhead and onto a substrate. For example, an exemplary operating temperature of a printhead utilizing a phase change ink is about 140° C. Accordingly, it is advantageous to have a phase change ink composition that has a melting temperature of at or below 140° C. However, it will be realized that other phase transition temperatures may be advantageous and that any such other range is within the scope and spirit of the present invention, For example, where a printhead has an exemplary operating temperature of 160° C., an ink composition having a melting temperature at or below 160° C. is advantageously encompassed by embodiments of the present invention. Example 3 is illustrative of one such advantageous formulation.

EXAMPLE 3

Magenta Ink Formulation

To a stainless steel beaker, 4265 g of Kemamide S180[6], 940.8 g of KE 100[7] 2645.7 g of tetraamide[8], 305 g of Santicizer 278[9] and 16.0 g of antioxidant N-445[10] were added. The beaker was placed in an oven maintained at a temperature of about 135° C. and the materials were melted. The beaker was then transferred to a temperature controlled mantel, also maintained at a temperature of about 135° C., and blended by stirring for approximately 30 min. To the blended mixture, 40.0 g of DDBSA[11], 67.2 g of the purified product of Example 2 and 16.0 g of C.I. Solvent Red 49[12] were added and the mixture was stirred for an additional 2 hr. The mixture was filtered hot using a Mott[13] apparatus with a Whatman #3 filter at a pressure of about 5 psi of nitrogen. The filtered phase change ink was poured into molds and allowed to solidify into ink sticks. The viscosity of the final ink product was measured using a Bohlin CSR viscometer at about 140° C. and found to be about 12.9 cPs. In addition, the ink sticks were used as an ink source for a Tektronix Phaser Model 340 printer. The ink was found to transfer completely and provide images of good color, print quality and durability.

[6]Kemamide S180—Stearyl Stearamide available from Witco of Memphis, Tenn.
[7]KE 100 Glycerol ester of hydrogenated abietic (rosin) acid available from Arakawa Chemical Industries, Ltd. of Osaka, Japan
[8]Tetraamide—Unirez 2970—available from Union Camp Corp. of Wayne, N.J.
[9]Santicizer 278—plasticizer available from Monsanto Chemical Co. of St. Louis, Mo.
[10]Naugard 445—antioxidant available from Uniroyal Chemical Co., Inc. of Middlebury, Conn.
[11]DDBSA—Bio-Soft S100 (Dodecylbenzene sulfonic acid)
[12]SR 49—Neptune Red Base NB 543 LD—Dye available from BASF Co., Renssalar, N.Y.
[13]Mott Corporation, Farrnington, Conn.

Phase change inks encompassed by the present invention are utilized in printing applications by melting at least a portion of a solid ink block to transform such portion to a liquid phase. The liquid phase ink is jetted through a printhead and applied onto a substrate. Once on the substrate, the ink cools to form an ink pattern which defines at least a portion of a visible image on the substrate.

It will be realized that embodiments in accordance with the present invention encompass any of the alternate phase change ink compositions as can be formulated employing the exemplary method of Example 3. Thus such alternate phase change ink compositions where alternate non-colorant materials are combined with at least one colorant encompassed by formulas 2–7 are within the scope and spirit of the instant invention as changing such non-colorant materials is recognized as a design choice. In addition, such alternate phase change ink compositions encompassing at least one colorant encompassed by formulas 2–7 and employing one or more colorant materials other than the exemplary C.I. Solvent Red 49, are also recognized as being within the scope and spirit of the instant invention as such alternate colorants are further recognized as design choices.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of printing, comprising:
    melting a phase change ink comprising a colorant having the formula:

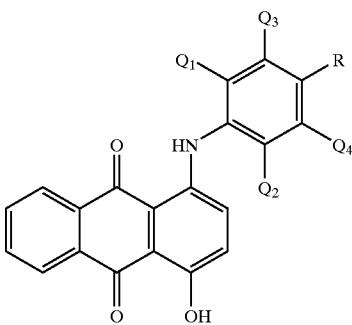

wherein at least one $Q_1$, $Q_2$, $Q_3$ and $Q_4$ is a halogen atom and any of $Q_1$, $Q_2$, $Q_3$ and $Q_4$ which is not a halogen atom is a hydrogen atom; and wherein R comprises at least two carbon atoms;

applying the melted ink to a substrate; and cooling the melted ink on the substrate to form at least a portion of a visible image on the substrate.

2. The method of claim 1 wherein the halogen atom is bromine.

3. The method of claim 1 wherein R comprises from 2 to 50 carbon atoms.

4. The method of claim 1 wherein R comprises $(CH_2)_nCH_3$, and wherein n is an integer of from 1 to 50.

5. The method of claim 1 wherein R comprises $(CH_2)_nCH_3$, and wherein n is 3, 5, 11 or 13.

6. The method of claim 1, wherein any two of $Q_1$, $Q_2$, $Q_3$ and $Q_4$ are halogen atoms and the two of $Q_1$, $Q_2$, $Q_3$ and $Q_4$ which are not halogen atoms are hydrogen atoms and, wherein the two halogen atoms can be the same or different than one another, and wherein R comprises at least two carbon atoms.

7. The method of claim 6 wherein at least one of the halogen atoms is bromine.

8. The method of claim 6 wherein both of halogen atoms are bromine.

9. The method of claim 6 wherein R comprises from 2 to 50 carbon atoms.

10. The method of claim 6 wherein R comprises $(CH_2)_nCH_3$, and wherein n is an integer of from 1 to 50.

11. The method of claim 6 wherein R comprises $(CH_2)_nCH_3$, and wherein n is 3, 5, 11 or 13.

12. The method of claim 6 wherein the colorant has the formula:

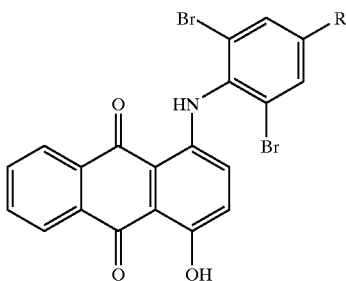

and wherein R comprises from 2 to 50 carbon atoms.

13. The method of claim 6 wherein the colorant has the formula:

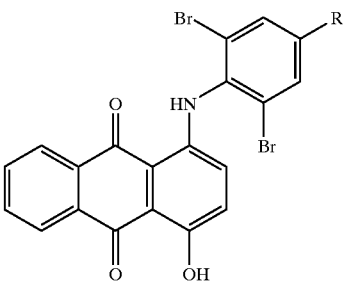

and wherein R comprises 4 carbon atoms.

14. A method of printing, comprising:
melting a phase change ink comprising a colorant having the formula:

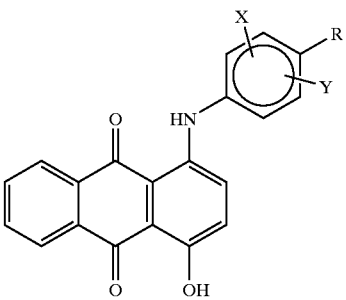

wherein R comprises at least two carbon atoms; X and Y are halogen atoms and can be the same or different from one another;

applying the melted ink to a substrate; and cooling the melted ink on the substrate to form at least a portion of a visible image on the substrate.

15. The method of claim 14, where R comprises from 2 to 50 carbon atoms.

16. The method of claim 14, where R comprises 4 carbon atoms.

17. The method of claim 14, where R comprises $(CH_2)_nCH_3$, and wherein n is an integer of from 1 to 100.

18. The method of claim 14, where R comprises $(CH_2)_nCH_3$, and wherein n is 3, 5, 11 or 13.

19. The method of claim 1, where the phase change ink is configured to be a solid at temperatures below about 30°C. and to melt at a temperature above 30° C.

20. The method of claim 14, where the phase change ink is configured to be a solid at temperatures below about 30° C. and to melt at a temperature above 30° C.

* * * * *